United States Patent
Chin (10) Patent No.: US 6,327,538 B1
(45) Date of Patent: Dec. 4, 2001

(54) METHOD AND APPARATUS FOR EVALUATING STONELEY WAVES, AND FOR DETERMINING FORMATION PARAMETERS IN RESPONSE THERETO

(75) Inventor: Wilson C. Chin, Houston, TX (US)

(73) Assignee: Halliburton Energy Services, Inc, Houston, TX (US)

(*) Notice: Subject to any disclaimer, the term of this patent is extended or adjusted under 35 U.S.C. 154(b) by 0 days.

(21) Appl. No.: 09/024,325

(22) Filed: Feb. 17, 1998

(51) Int. Cl.$^7$ .................................................... G01V 1/30
(52) U.S. Cl. ................................................. 702/18; 702/14
(58) Field of Search ................................. 367/27; 702/10, 702/18, 14, 6

(56) References Cited

U.S. PATENT DOCUMENTS

| | | |
|---|---|---|
| 4,183,028 | 3/1989 | Liu . |
| 4,740,928 * | 4/1988 | Gutowski et al. ............ 367/27 |
| 4,779,241 * | 10/1988 | Atalar et al. ............. 367/104 |
| 4,819,214 * | 4/1989 | Gutowski et al. ............ 367/27 |
| 5,197,038 | 3/1993 | Chang .................... 367/28 |
| 5,357,481 * | 10/1994 | Lester et al. ............... 367/31 |
| 5,616,840 | 4/1997 | Tang ..................... 73/152.05 |

FOREIGN PATENT DOCUMENTS

WO 93/07513   4/1993   (WO) .

OTHER PUBLICATIONS

"Permeability Quantification From Borehole Stoneley Waves," V. Saxena, SPWLA 35th Annual Logging Symposium, Jun. 19–22, 1994.

"Well Logging For Physical Properties," J. Hearst and P. Nelson, published 1985, pp. 310–311.

"Permeability Estimation from Full Waveform Acoustic Logging Data," D.R. Burns, et al, The Log Analyst, Mar.–Apr. 1988, pp. 112–122.

Predicting Relative and Absolute Variations of In–Situ Permeability from Full–Waveform Acoustic Logs. D.R. Burns, The Log Analyst, May–Jun. 1991. pp. 246–255.

Chang, Low Frequency Tube Waves in Permeable Rocks, Geophysics, vol. 53, No. 4, 1988, pp. 519–527.

Norris, Stoneley–wave Attenuation and Dispersion in Permeable Formations, Geophysics, vol. 54, No. 3, 1989, pp. 330–341.

* cited by examiner

Primary Examiner—Christine K. Oda
Assistant Examiner—Victor J. Taylor (57) ABSTRACT

A subsurface formation may be evaluated through use of data obtained from Stoneley wave propagation in the fluid column within the borehole. Either wave amplitude or phase velocity may be utilized to determine composite lithology parameters. These composite lithology parameters reflect fluid and/or formation characteristics, and functionally relate such characteristics in a manner as to facilitate the determination of formation permeability in a well logging environment.

19 Claims, 11 Drawing Sheets

FIG. 1

INPUT PERM = 0.0001 DARCY, PREDICTED KDC = 0.0002 DARCY.

FIG. 2A

INPUT PERM = 0.0001 DARCY, PREDICTED KDC = 0.0002 DARCY.

FIG. 2B

INPUT PERM = 0.0010 DARCY, PREDICTED KDC = 0.0013 DARCY.

FIG. 3A

INPUT PERM = 0.0010 DARCY, PREDICTED KDC = 0.0013 DARCY.

FIG. 3B

INPUT PERM = 0.0100 DARCY, PREDICTED KDC = 0.0122 DARCY.

FIG. 4A

INPUT PERM = 0.0100 DARCY, PREDICTED KDC = 0.0122 DARCY.

FIG. 4B

INPUT PERM = 0.1000 DARCY, PREDICTED KDC = 0.1209 DARCY.

FIG. 5A

INPUT PERM = 0.1000 DARCY, PREDICTED KDC = 0.1209 DARCY.

FIG. 5B

INPUT PERM = 0.5000 DARCY, PREDICTED KDC = 0.6127 DARCY.

FIG. 6A

INPUT PERM = 0.5000 DARCY, PREDICTED KDC = 0.6127 DARCY.

FIG. 6B

INPUT PERM = 1.0000 DARCY, PREDICTED KDC = 1.2414 DARCY.

FIG. 7A

INPUT PERM = 1.0000 DARCY, PREDICTED KDC = 1.2414 DARCY.

FIG. 7B

INPUT PERM = 2.0000 DARCY, PREDICTED KDC = 2.4427 DARCY.

FIG. 8A

INPUT PERM = 2.0000 DARCY, PREDICTED KDC = 2.4427 DARCY.

FIG. 8B

INPUT PERM = 5.0000 DARCY, PREDICTED KDC = 4.8649 DARCY.

FIG. 9A

INPUT PERM = 5.0000 DARCY, PREDICTED KDC = 4.8649 DARCY.

FIG. 9B

INPUT PERM = 10.0000 DARCY, PREDICTED KDC = 5.7577 DARCY.

FIG. 10A

INPUT PERM = 10.0000 DARCY, PREDICTED KDC = 5.7577 DARCY.

METHOD AND APPARATUS FOR EVALUATING STONELEY WAVES, AND FOR DETERMINING FORMATION PARAMETERS IN RESPONSE THERETO

BACKGROUND OF THE INVENTION

The present invention relates generally to methods and apparatus for evaluating Stoneley waves, and more particularly relates to new methods and apparatus for evaluating earth formations through use of such waves and for determining the properties of earth formations, such as permeability, through evaluation of Stoneley wave data.

Interfacial waves are waveforms generated at fluid interfaces. The interface can be that between two fluids, as in the interface between two liquids; or it can be between a fluid and a solid, as in the case of Stoneley waves. In the context of well logging and formation analysis, Stoneley waves will traverse the interface between a generally compressible fluid column in a borehole and the slightly elastic sidewalls defining that borehole. Stoneley waves have long been recognized in well logging and seismic surveying, but typically have been regarded as undesirable manifestations which have interfered with obtaining sonic speed data associated with pressure and shear waves. Many conventional logging systems have sought to eliminate, or compensate for, the detection of Stoneley waves in evaluating formation parameters.

Some methods have, however, been proposed to establish a correlation between Stoneley waves and formation permeability. Generally, these methods have been based upon experimental observations and detailed numerical simulation to generate models. Such analyses have established the correlation of Stoneley waves to eight distinct rock, fluid and geometric parameters:

1. Well radius ($R_{well}$)
2. Rock porosity ($\phi$)
3. Formation permeability (k)
4. Solid shear modulus ($G_{shear}$)
5. Borehole mud bulk modulus ($B_{mud}$)
6. Mud density ($\rho_{mud}$)
7. Pore fluid bulk modulus ($B_{oil}$)
8. Pore fluid viscosity ($\mu_{oil}$)

Such analyses are described, for example, in "Low-Frequency Tube Waves in Permeable Rocks," by Chang, et. al., (Geophysics, Volume 53, April, 1988); and modeling programs based upon similar analyses have been prepared by the Massachusetts Institute of Technology Full Waveform Acoustic Logging Consortium. A similar analysis is also set forth in "Permeability Estimation From Full Waveform Acoustic Logging Data," by Burns, et. al. (The Log Analyst, March–April 1988). Evaluation of formation permeability through use of Stoneley waves is also disclosed in "Predicting Relative and Absolute Variations of In-Situ Permeability From Full Waveform Acoustic Logs," by Burns (The Log Analyst, May–June 1991).

Such analyses have the drawback of being numerically oriented and extremely complex, and thus being highly disadvantageous, if not impractical, for use in evaluating formations in a commercially viable manner. For example, because of the dependence of permeability upon at least eight independent formation and fluid variables, solutions for permeability have been difficult, and have yielded less than optimally reliable results.

Accordingly, the present invention provides a new method and apparatus for evaluating formation parameters in response to Stoneley wave data. These methods are less complex than previously known analysis, and different approaches are provided which facilitate alternate methods of determining formation parameters.

SUMMARY OF THE INVENTION

In accordance with the present invention, parameters of a sub-surface formation, including the permeability of the formation, may be evaluated through use of measurements of Stoneley wave propagation from an energy source, preferably measured at at least two spaced locations within the wellbore. The Stoneley wave propagation data will be correlated with parameters of the formation and of the fluids within which the Stoneley waves are propagating. Analysis may be made in reference to either Stoneley wave amplitude or phase velocity. In one preferred implementation, the method includes the defining of a single velocity parameter which is functionally representative of sound speed within the fluid column within the borehole, adjusted for the effects of sidewall elasticity. In a particularly preferred implementation, a predetermined relationship is established between the velocity parameter, the formation parameters and the fluid parameters to define a single lithology parameter which may be utilized to determine permeability, thereby minimizing the number of variables which must be considered.

BRIEF DESCRIPTION OF THE DRAWINGS

In FIGS. 2–10, formation and fluid parameters for a typical logging situation were assumed, and generated synthetic Stoneley seismograms are shown. Only the (input) permeability varies from figure to figure. Predicted values of permeability versus input values are listed in each figure.

DETAILED DESCRIPTION OF PREFERRED EMBODIMENTS

Methods in accordance with the present invention utilize measurements of at least two Stoneley waveforms obtained at spaced receiver stations. In an anticipated implementation, energy will be transmitted from a logging tool transmitter within an earth borehole into the fluid column within the borehole, and will be received at two or more spaced receiver stations within the logging tool in a manner known to those skilled in the art. The energy input will preferably be input to the borehole at a frequency within a range of approximately 500 Hz–2 KHz, with frequencies toward the lower end of this range being preferred. The multiple receivers within the logging tool should have either matched responses or known responses to facilitate compensation to achieve response equalization. Thus, receivers can either be manufactured and selected to provide two receivers which yield essentially identical responses to the same energy stimulus (i.e., "matched receivers"); or the response characteristics of the receivers may be evaluated such that an actual measured response may be adjusted (such as through amplification, attenuation, etc.) to yield a compensated waveform, or numerical representation thereof, which matches the responses (either actual or compensated) of other receivers. Alternatively, known responses of individual receivers may be normalized to a selected reference response curve.

In contrast to previous numerically based methods, the present invention facilitates evaluating the permeability of a formation in response to the sound speed in the fluid column within the borehole relative to the time differential between receipt of a Stoneley wave at each of the two receivers. In accordance with one implementation of the present invention, the permeability (k) of a formation may be evaluated in general response to the following relation:

$$k = \frac{2\mu_{oil}\rho_{oil}c_{oil}^2 R_{well}^2 \{(\Sigma_c - \Sigma_d)/\Sigma_c\}^2 (V/\Delta t)^2}{\rho_{mud}^2 V^5 \phi \{8\pi V f_0 - (2V/\Delta t)(\Sigma_c - \Sigma_d)/\Sigma_c\}} \quad (1)$$

Wherein:

$\mu_{oil}$ represents the pore fluid viscosity;

$\rho_{oil}$ represents the density of the fluid or "oil" within the formation;

$c_{oil}$ represents the sound speed in the formation fluid (or "oil");

$R_{well}$ represents the well radius;

$\Sigma_c$ represents the total energy of the waveform from the first receiver "c" closer to the transmitter;

$\Sigma_d$ represents the total energy of the waveform from a second more distant receiver "d";

$\rho_{mud}$ represents the density of the mud (i.e., the density of the fluid within the fluid column);

$\phi$ represents the porosity of the formation;

$f_0$ represents the center frequency (Hz) at which the transmitter operates; and $\Delta t$ represents the distance between the two receivers $D_{recvr}$ divided by the velocity V, that is $\Delta t = D_{recvr}/V$; where V represents a velocity parameter defined by the relation:

$$V = 1/\sqrt{\{\rho_{mud}(1/B_{mud} + 1/G_{shear})\}} > 0 \quad (2)$$

Wherein:

$B_{mud}$ represents the bulk modulus of the borehole mud or fluid, and $G_{shear}$ represents the solid shear modulus.

As can be seen from a review of equation 2, the velocity parameter (V) is representative of the sound speed within the mud column, and takes into consideration the elasticity of the rock which contains the column. As those skilled in the art will recognize, if $G_{shear}$ were infinite, then the velocity parameter (V) would reduce to the mud sound speed $$\left(\sqrt{\frac{B_{mud}}{\rho_{mud}}}\right).$$

However, since $G_{shear}$ will always be finite, the velocity parameter always will be less than the mud sound speed. Velocity parameter (V), therefore, represents the mud sonic speed as a function of solid shear modulus.

Figure 1:
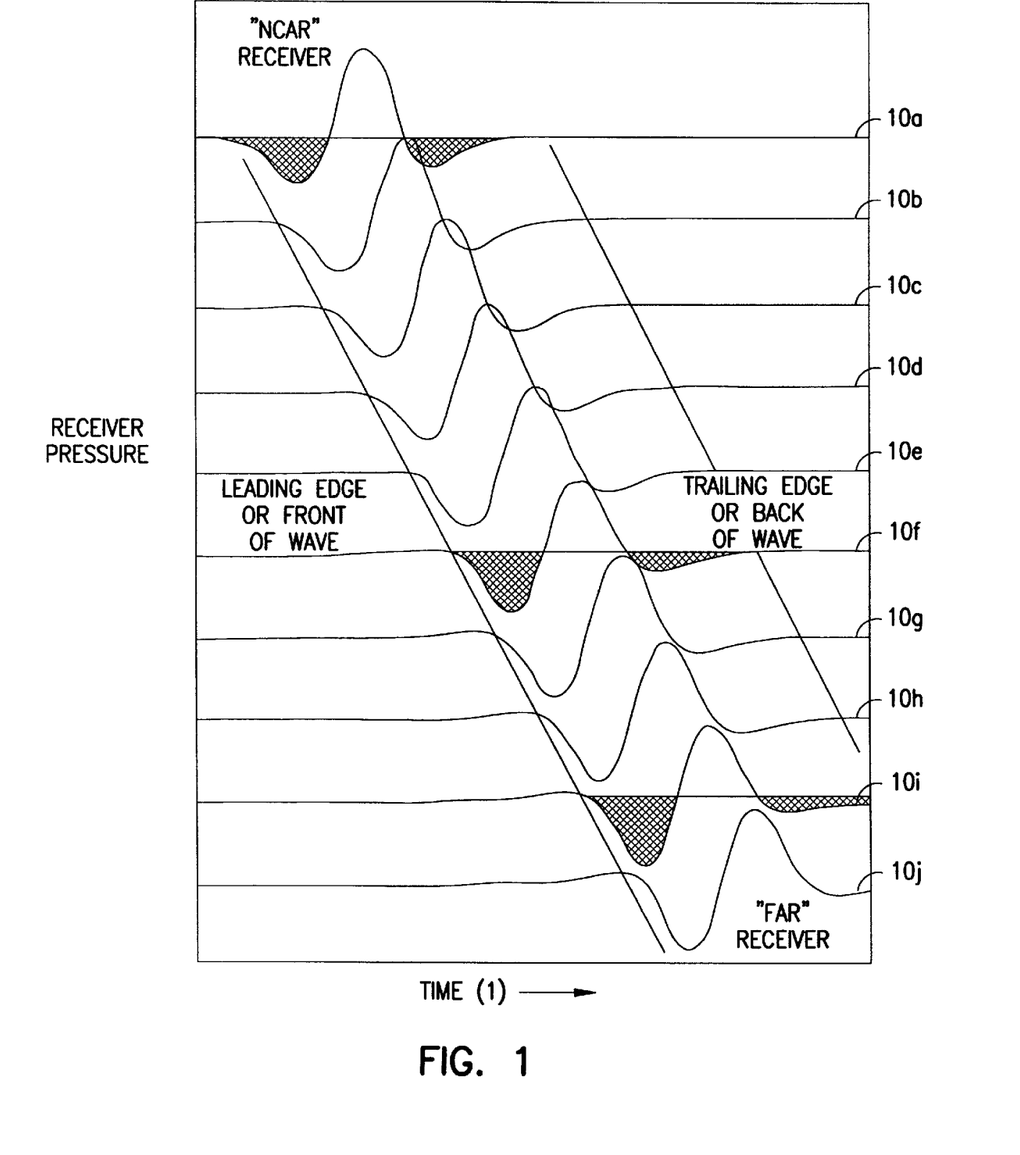
FIG. 1 depicts Stoneley waveforms as detected at a plurality of receivers in space in relation to an energy source or transmitter (not shown), depicted as a function of time.
Figure 2A:
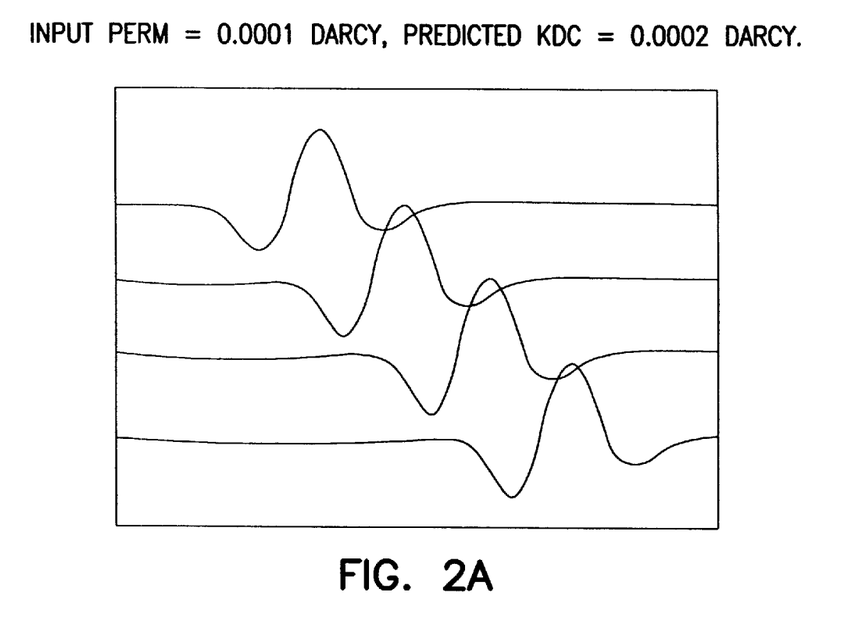
FIGS. 2A–B depict synthetically modeled Stoneley waves under assumed formation conditions, at a modeled permeability of 0.0001 darcy; depicted in FIG. 2A as time traces, and in FIG. 2B as amplitude spectra.
Figure 2B:
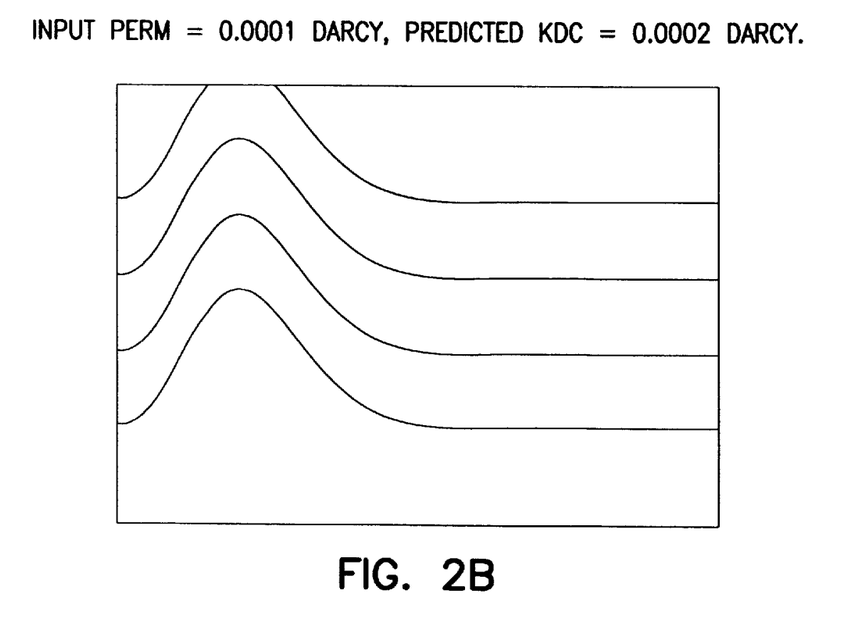
Figure 3A:
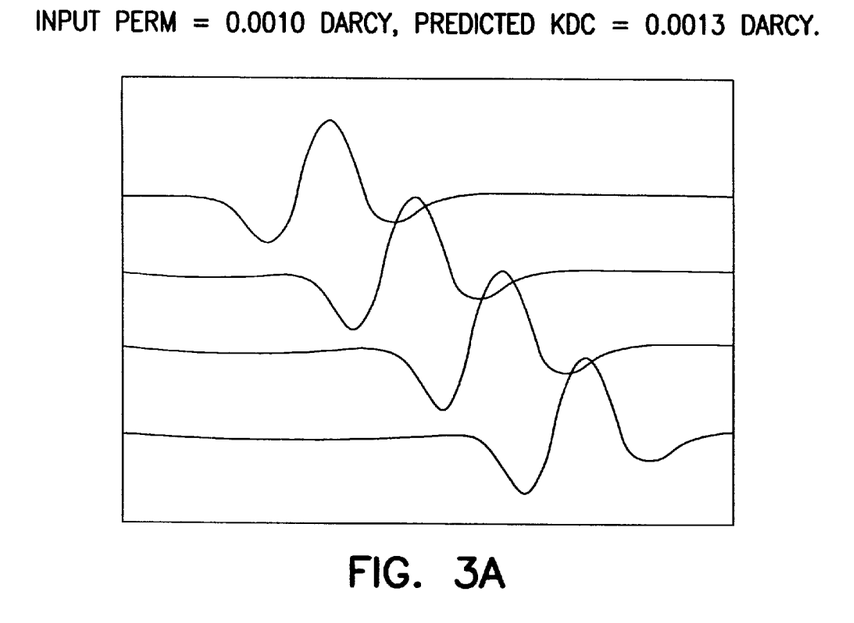
FIGS. 3A–B depict synthetically modeled Stoneley waves under assumed formation conditions, at a modeled permeability of 0.0010 darcy; depicted in FIG. 3A as time traces, and in FIG. 3B as amplitude spectra.
Figure 3B:
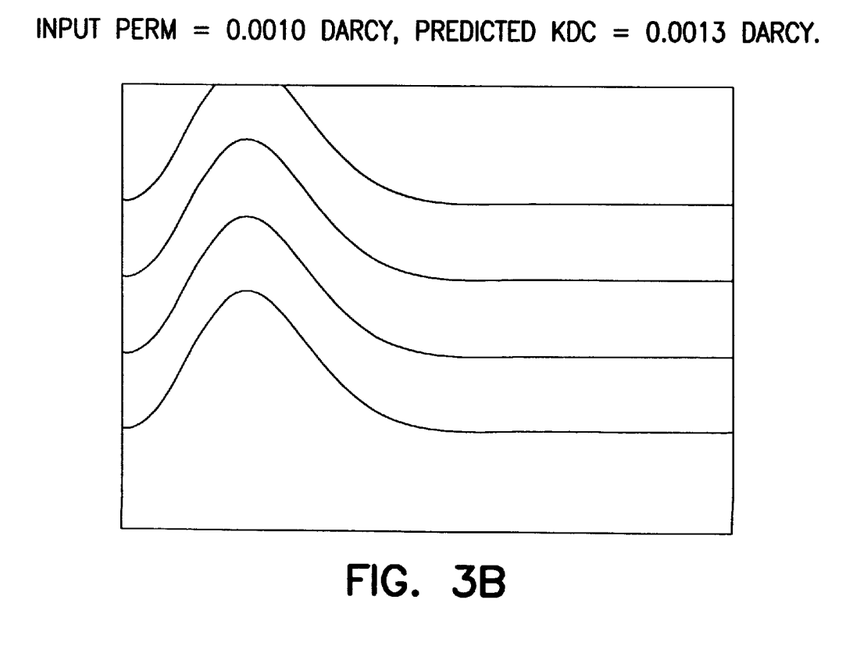
Figure 4A:
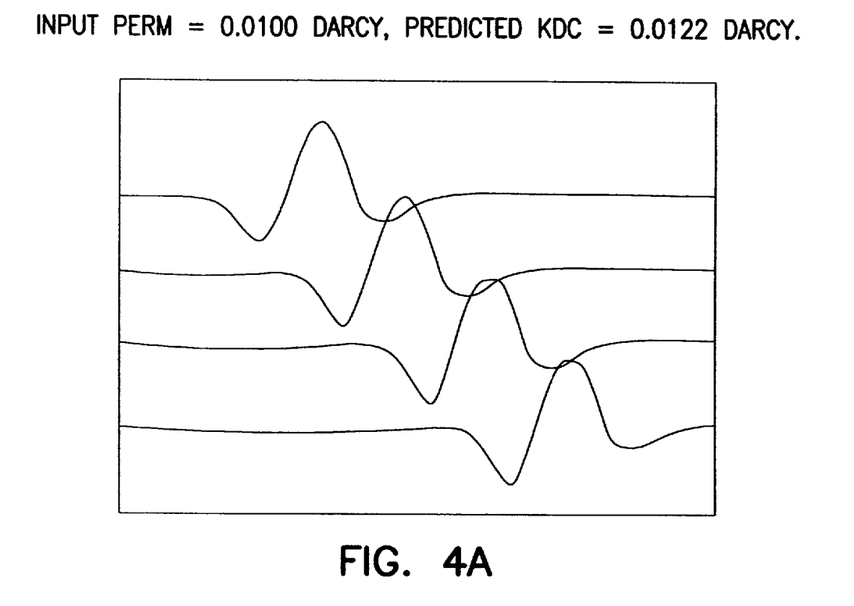
FIGS. 4A–B depict synthetically modeled Stoneley waves under assumed formation conditions, at a modeled permeability of 0.0100 darcy; depicted in FIG. 4A as time traces, and in FIG. 4B as amplitude spectra.
Figure 4B:
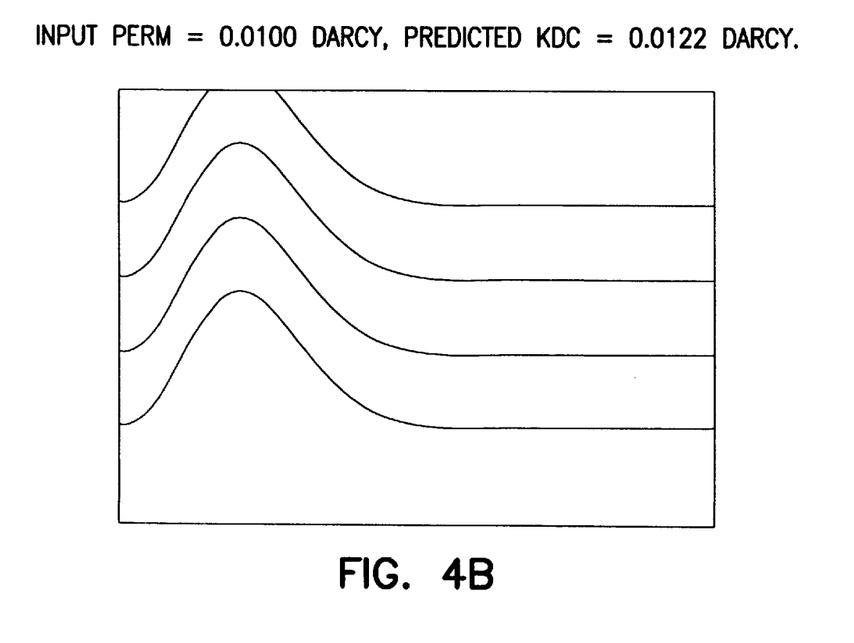
Figure 5A:
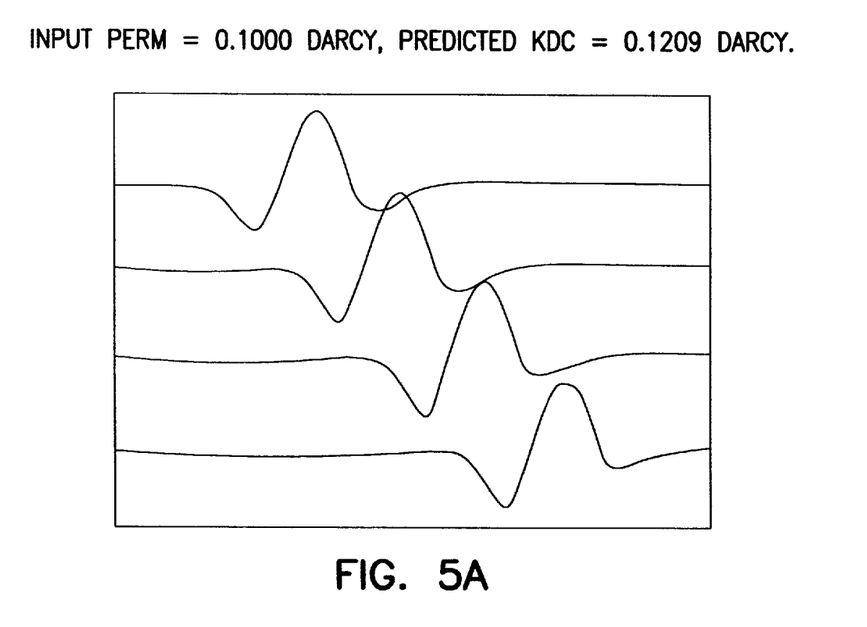
FIGS. 5A–B depict synthetically modeled Stoneley waves under assumed formation conditions, at a modeled permeability of 0.1000 darcy; depicted in FIG. 5A as time traces, and in FIG. 5B as amplitude spectra.
Figure 5B:
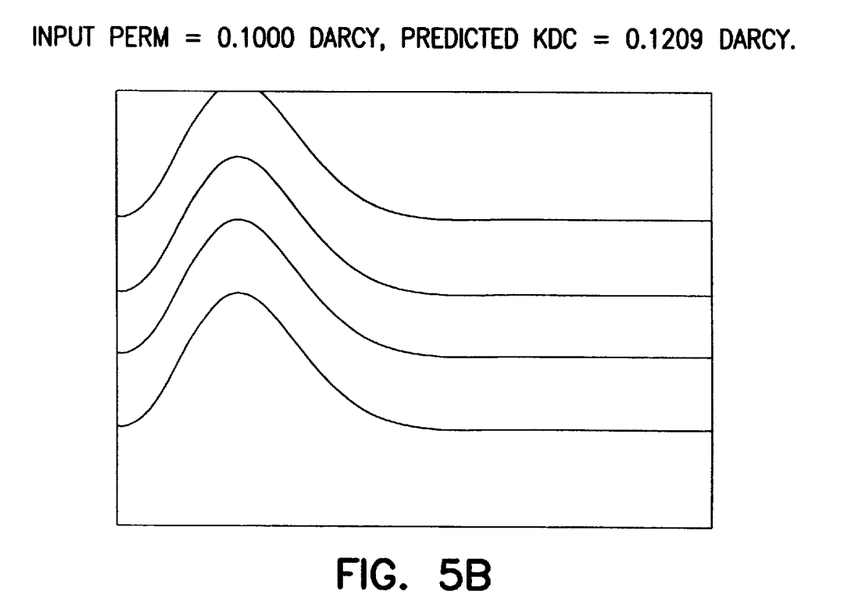
Figure 6A:
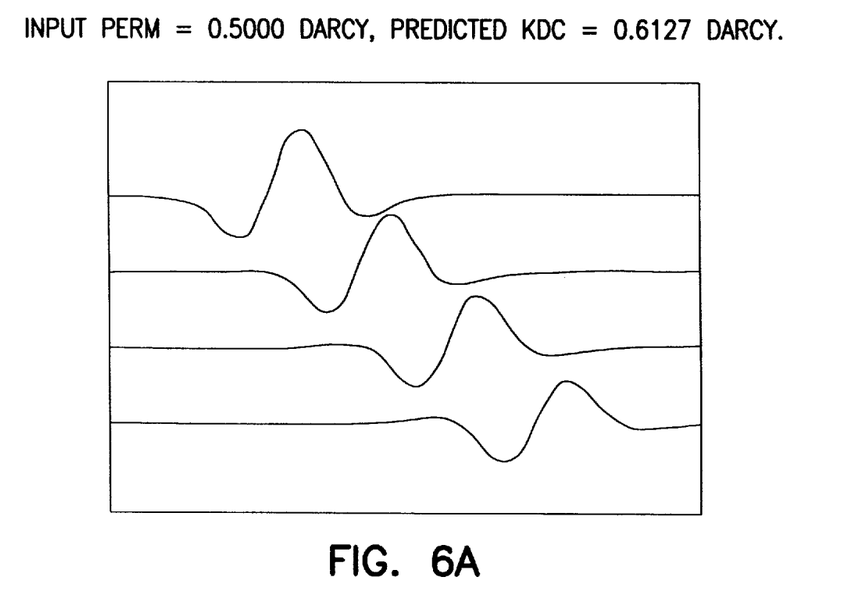
FIGS. 6A–B depict synthetically modeled Stoneley waves under assumed formation conditions, at a modeled permeability of 0.5000 darcy; depicted in FIG. 6A as time traces, and in FIG. 6B as amplitude spectra.
Figure 6B:
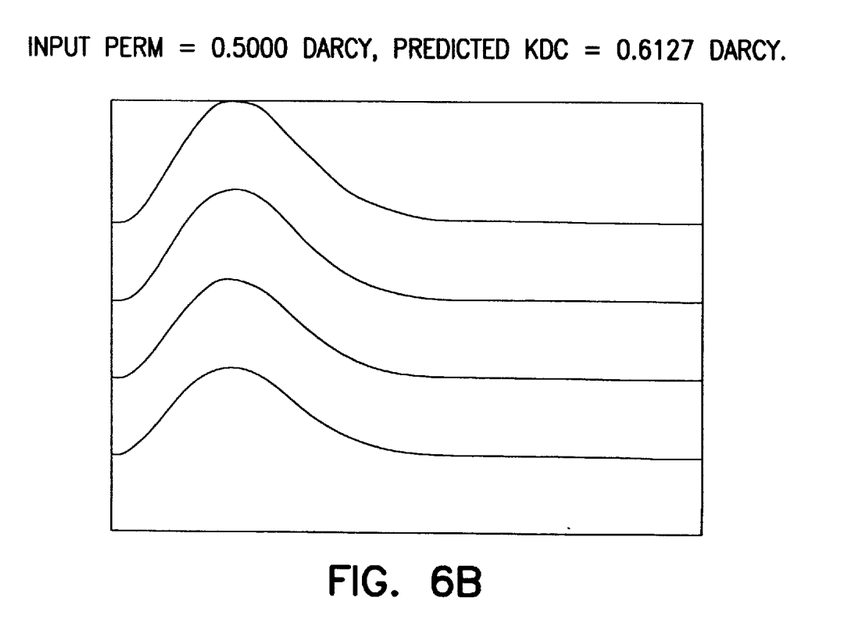
Figure 7A:
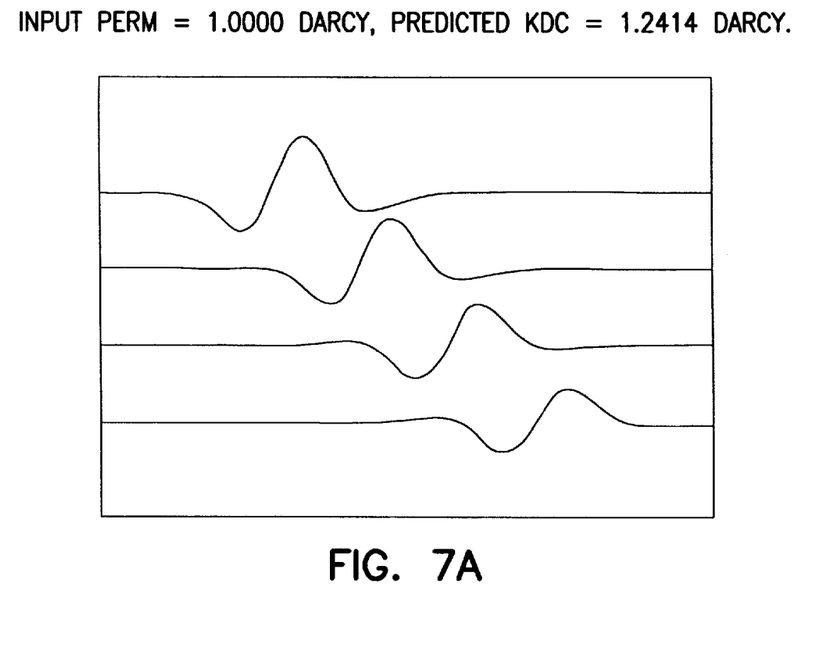
FIGS. 7A–B depict synthetically modeled Stoneley waves under assumed formation conditions, at a modeled permeability of 1.0000 darcy; depicted in FIG. 7A as time traces, and in FIG. 7B as amplitude spectra.
Figure 7B:
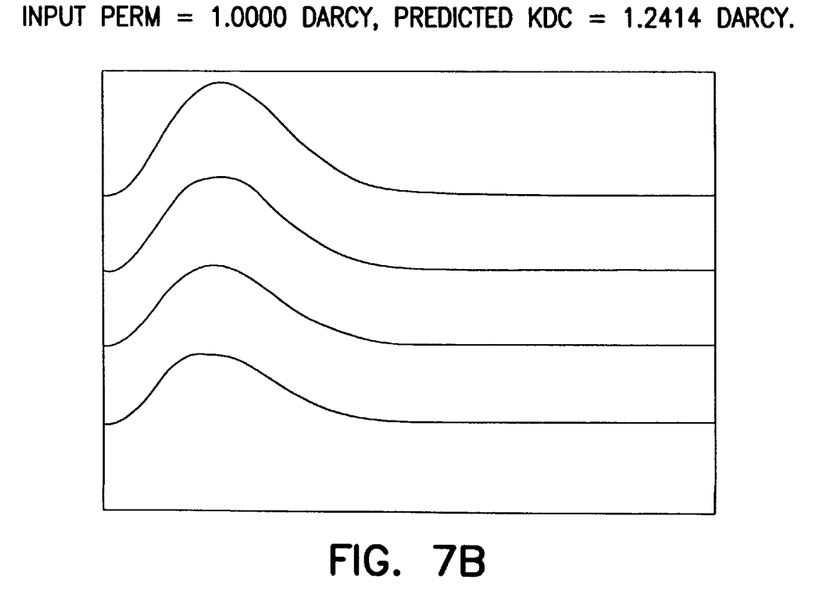
Figure 8A:
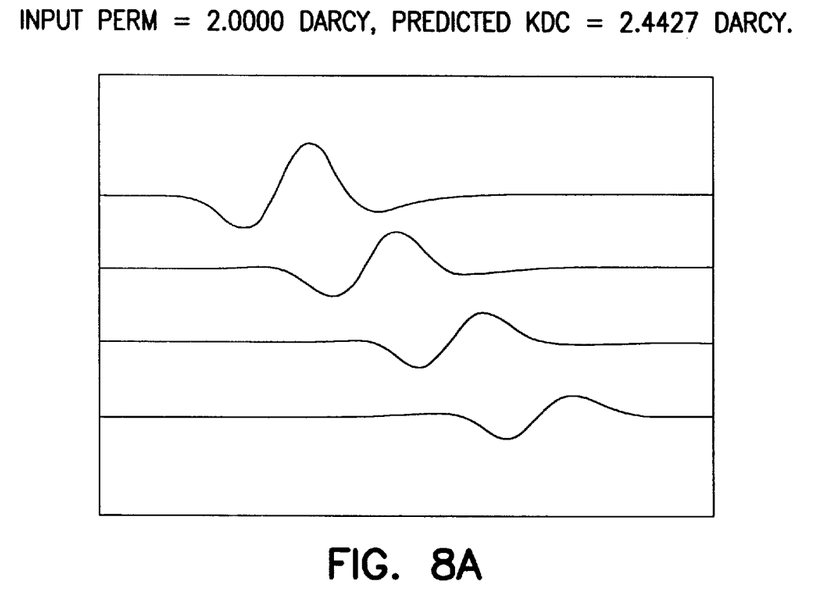
FIGS. 8A–B depict synthetically modeled Stoneley waves under assumed formation conditions, at a modeled permeability of 2.0000 darcies; depicted in FIG. 8A as time traces, and in FIG. 8B as amplitude spectra.
Figure 8B:
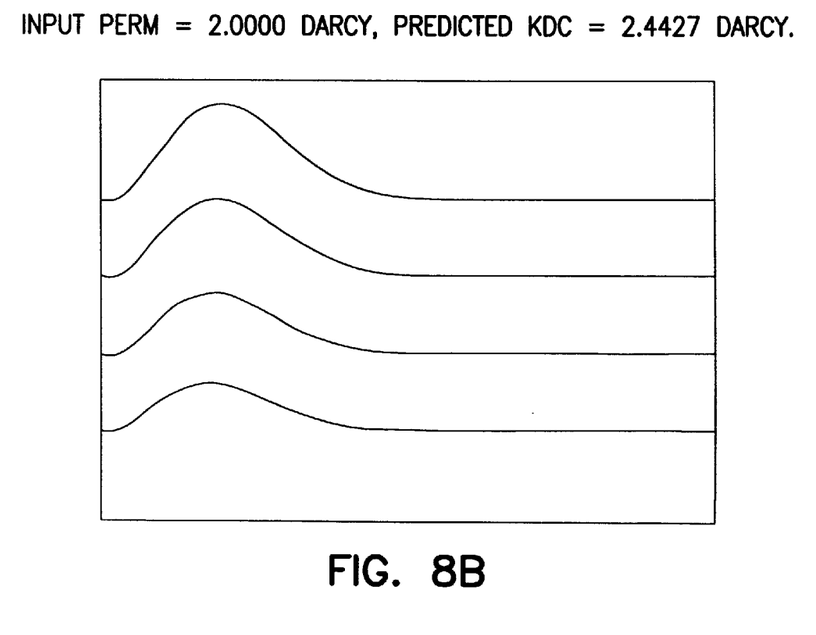
Figure 9A:
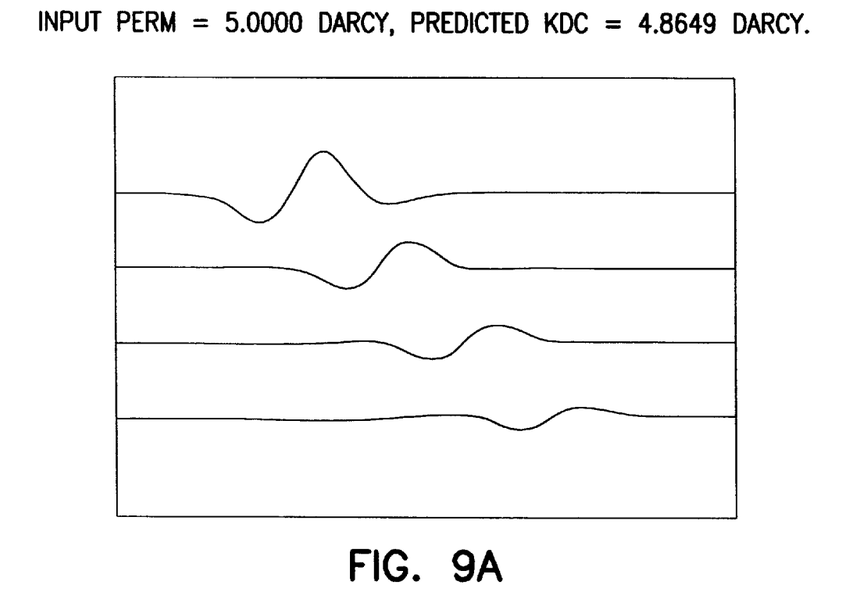
FIGS. 9A–B depict synthetically modeled Stoneley waves under assumed formation conditions, at a modeled permeability of 5.0000 darcies; depicted in FIG. 9A as time traces, and in FIG. 9B as amplitude spectra.
Figure 9B:
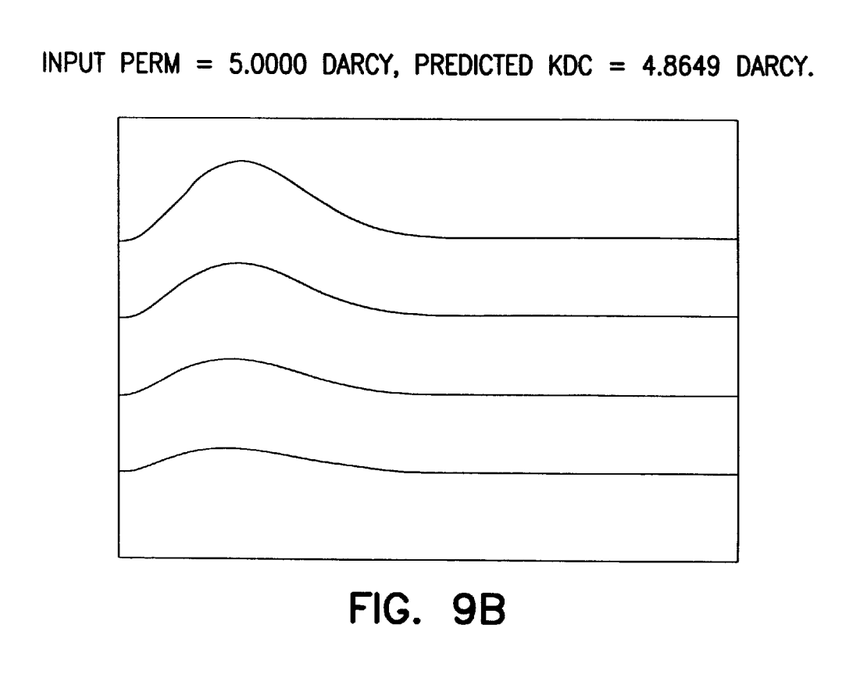
Figure 10A:
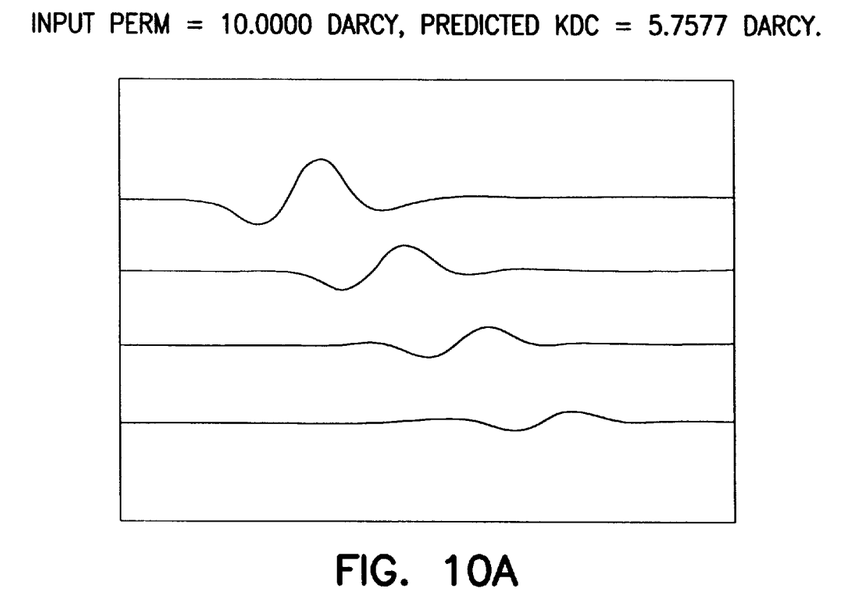
FIGS. 10A–B depict synthetically modeled Stoneley waves under assumed formation conditions, at a modeled permeability of 10.0000 darcies; depicted in FIG. 10A as time traces, and in FIG. 10B as amplitude spectra.
Figure 10B:
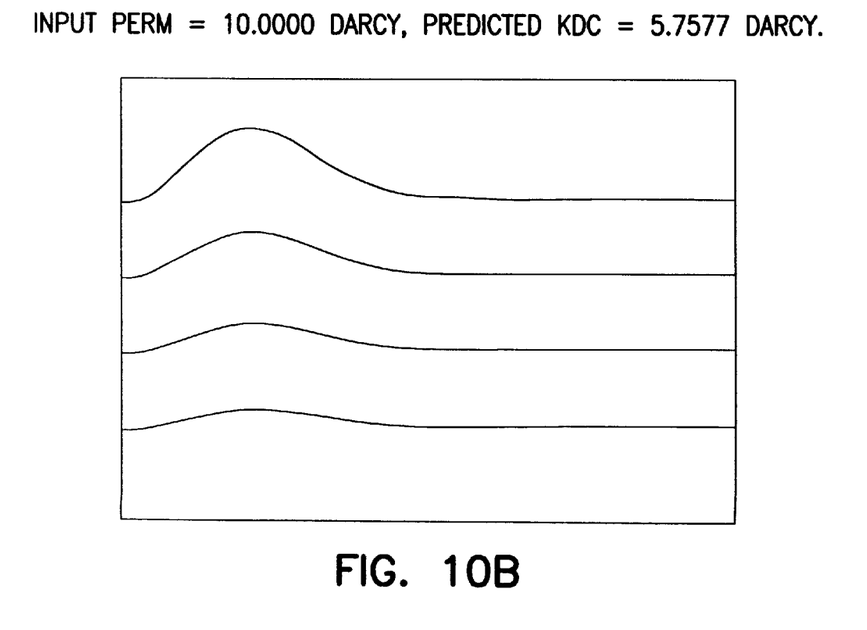

Referring now to FIG. 1, therein are depicted Stoneley waveforms at ten spaced receivers, expressed as a function of modeled receiver pressure versus time. A first trace 10a represents the receiver pressure at a receiver closest to the energy source generating the wave. As can be seen, for example, through comparison of trace 10a to trace 10d, as the distance from the energy source to the receiver increases, the energy of the front portion of the wave increases over time, while the energy of the trailing edge decreases over time. However, the center energy remains essentially constant in time. Thus, the energy in the Stoneley wave redistributes from the back of the wave to the front of the wave as the wave travels in time. As will be discussed below in relation to equations 1–7, one method for determining permeability in accordance with the present invention relies upon the determining of Stoneley wave amplitudes at a plurality of receivers. The filtering to isolate Stoneley waves can potentially lend to erroneous amplitude determinations. The depicted energy redistribution may be utilized to confirm accurate filtering, and thus accurate Stoneley wave data.

Referring now to FIGS. 2–10A–B, therein are depicted exemplary synthetic time domain Stoneley waveforms generated across a range of assumed permeabilities, with all other formation and fluid properties fixed. The waveforms of FIGS. 1 and 2–10A–B were generated utilizing a computer program developed by the Massachusetts Institute of Technology Full Waveform Acoustic Logging Consortium, which solves the coupled elastic and fluid equations describing general Stoneley waves. Here, the program is essentially run as a "black box" model. Prior to the present invention, this model is believed to generally represent the state of the art in permeability analysis through Stoneley waveforms. The computer program itself is used as part of a numerically intensive effort to determine permeability. The present invention, however, is analytically based. The waveforms generated by the program are therefore depicted here to demonstrate the results obtained through application of the inventor's analytical methods.

Utilizing the Massachusetts Institute of Technology model, waveforms were generated with assumed parameters for a typical mud, and for a typical rock, such that only the permeability changed between the examples. These waveforms can be viewed as acoustic logs, generally obtained by field log measurements. As can be seen in FIGS. 2–10A–B, the modeled permeability ranged between 0.0001 darcy and 10 darcies. Thus, the modeled "actual permeabilities" extend over a range of 6 orders of magnitude. These "actual permeabilities" are compared to the predicted permeability (or "predicted kdc") obtained utilizing the relation of equation 1. It is important to note that, generally speaking, methods for estimating permeability are considered viable and satisfactory if they are within 500% of actual permeability. The ranges as set forth in the table below, can be seen to fall within Lapproximately 20% of the modeled "actual" permeability, except at the extremes, where the deviation is still well within acceptable limits.

TABLE 1

| | | | |
|---|---|---|---|
| FIG. 2 | Actual perm = .0001 darcy | Predicted kdc = .0002 | darcy % error = 54 |
| FIG. 3 | Actual perm = .0010 darcy | Predicted kdc = .0013 | darcy % error = 30 |
| FIG. 4 | Actual perm = .0100 darcy | Predicted kdc = .0122 | darcy % error = 22 |
| FIG. 5 | Actual perm = .1000 darcy | Predicted kdc = .1209 | darcy % error = 20 |
| FIG. 6 | Actual perm = .5000 darcy | Predicted kdc = .6127 | darcy % error = 22 |
| Pig. 7 | Actual perm = 1.0000 darcy | Predicted kdc = 1.2414 | darcy % error = 24 |
| FIG. 8 | Actual perm = 2.0000 darcy | Predicted kdc = 2.4427 | darcy % error = 22 |
| FIG. 9 | Actual perm = 5.0000 darcy | Predicted kdc = 4.8649 | darcy % error = 2 |
| FIG. 10 | Actual perm = 10.0000 darcy | Predicted kdc = 5.7577 | darcy % error = 42 |

The "predicted kdc" is the permeability "k" which is predicted according to equation 1. The model of equation 1 assumes a mono-chromatic frequency, whereas the source utilized to generate the synthetic waveforms is a transient excitation about a given center frequency. For purposes of the modeling reported in Table 1, the center frequency was assumed to be a monochromatic frequency. It is believed that improved filtering would yield a further improved correlation.

Additionally, the model of equation 1 is based upon the dimension of a borehole radius without a tool therein. In the modeling reported in Table 1, the borehole radius was adjusted to utilize an "effective radius" which subtracts out the cross-sectional area occupied by a conventional logging tool.

Thus, the determination of permeability has been achieved through use of a simple "lumped" parameter given in equation 1 to reflect the sound speed in the mud columns, as that sound speed is affected by the "sidewall elasticity" of the borehole-defining formation.

In addition to the model in equations 1 and 2, further refined modeling is possible in accordance with the analytical techniques of the present invention. The present invention also contemplates the recognition that Stoneley wave propagation may be described in terms of a single dimensional parameter $\beta$. This single dimensional parameter $\beta$ may be defined as follows:

$$\beta = (\rho_{mud} V^{5/2} / R_{well}) \sqrt{\{k\phi / (2\mu_{oil} B_{oil})\}} > 0 \qquad (3)$$

Parameter $\beta$ incorporates the modified mud sonic speed (V) and all other fluid, rock and geometrical effects. Parameter $\beta$, therefore, controls both wave energy dispersion and dissipation, and is proportional to the square root of permeability. Because this parameter reduces the number of dependent parameters to one (from eight), the parameter facilitates solution for formation characteristics such as permeability in a logging environment. Permeability is not the only parameter that can be determined using the present approach. Whenever any seven of the eight listed parameters are available, the remaining single parameter can be predicted. Such solutions may be obtained through multiple methods.

As a first example, the Stoneley waves may be studied in terms of amplitude. In evaluating the wave energy following a wave packet, wherein E (x,t) is the energy density, and $x_1(t)$, and $x_2(t)$ represent ray trajectories, and x and t denote propagation coordinate and time, respectively, the rate of change of total energy ($\Sigma$) may be obtained by the following relation:

$$d\Sigma(t)/dt = \int_{x_1(t)}^{x_2(t)} \{\partial E(x, t)/\partial t + \partial \{dx/dt \ E(x, t)\}/\partial x\} dx \qquad (4)$$

The equation:

$$\partial E/\partial t + \partial (c_g E)/\partial x = 2\Omega^i E \qquad (5)$$

represents a well known wave energy conservation law, wherein $c_g$ represents the group velocity. The Stoneley approximation $-\beta K^{1/2}$ may be substituted for the dissipation rate $\Omega^i(K)$, where K is the acoustic wave number, to yield the approximate relation:

$$d\Sigma(t)/dt = -2\beta K^{1/2}\Sigma(t) \qquad (6)$$

Where the velocity dx/dt is identified with the group velocity $c_g$, and wherein $2\pi f_0 \approx VK$, where $f_0$ is assumed to be a nearly mono-chromatic wave; equation 6 may now be rewritten so as to express the rate of change in total energy as follows:

$$d\Sigma(t)/dt = -2\beta(2\pi f_0/V)^{1/2}\Sigma(t) \qquad (7)$$

Equation 7 may then be rearranged and substituted again to isolate the dimensional parameter $\beta$ as follows:

$$\beta = -\tfrac{1}{2}(V/2\pi f_0)^{1/2}\Delta t^{-1} d\Sigma(t)/\Sigma(t) \qquad (8)$$

In this manner, the entire right side of the equation may be evaluated using data filtered to pass only Stoneley waves. The relative loss of total energy ($d\Sigma/\Sigma$) can be obtained from any two receivers separated by a travel time of $\Delta t$. Preferably, once the parameter $\beta$ is determined in this manner, any term in the right side of equation 3 which cannot otherwise be supplied from experimental data may be solved for when the remaining terms are known.

As can be appreciated from consideration of the above discussion, this amplitude measurement approach is dependent upon direct measurement of wave amplitudes at each receiver, and upon the filtering to remove non-Stoneley waves. This approach may be satisfactory for many applications. However, an alternative approach has been discovered which facilitates the determination of permeability through reference to Stoneley wave phase velocity.

It has previously been determined that the real frequency $\omega^r$ of a Stoneley wave is characterized by a dispersion relation as follows:

$$\omega^r(K) = VK - \beta K^{1/2} \qquad (9)$$

Therefore, the phase velocity ($c_p$) may be expressed as follows:

$$c_p = \omega^r(K)/K = V - \beta K^{-1/2} \qquad (10)$$

It is then possible to combine equation 10, again assuming a non-monochromatic wave $2\pi f_0 \approx VK$, with $\Omega^i = -\beta K^{1/2}$, and to rearrange, thereby defining the relation in terms of permeability as follows:

$$k = \{4\pi f_0(V-c_p)^2 R_{well}^2 / (\phi \rho_{mud}^2 V^6)\} \times \{\mu_{oil} c_{oil}^2 \rho_{oil}\} \qquad (11)$$

Both the approaches of equation 1 above and of equation 11 are based upon an assumption that permeability is the only significant source of attenuation of the Stoneley waves. In many cases, however, this may not be true. It is known in the seismic arts that waves in dry rocks attenuate exponentially as $e^{-\alpha x}$, wherein the spatial attenuation rate ($\alpha$) is typically small, and in many cases may be directly proportional to the frequency (f). However, in accordance with the present invention, it has been determined that the attenuation rate must be proportional to $f^{1/2}$ where permeability effects are predominant. Thus, where attenuation due to friction loss and from permeability are both present, the spatial attenuation rate may be expressed as follows:

$$\alpha = c_1 f + c_2 f^{1/2} \qquad (12)$$

Wherein:

f represents the frequency;

$c_1$ is a constant describing the classic loss rate which is directly proportional to frequency, values for which for individual rock types are known to the industry;

$c_2$ is a constant directly related to parameter $\beta$, which describes the extent to which the specific lithology is permeable.

Thus, when time domain receiver waveforms are available from at least two receivers, the spectral amplitudes of the waveforms may be compared frequency by frequency to facilitate a fit to the regression of equation 12. Once the regression has been satisfied to determine $c_2$, parameter $\beta$ may calculated and used, as shown previously, to obtain permeability. Importantly, unlike other known systems, the use of a single constant, or of a single parameter $\beta$ as a constant, facilitates a new methodology for correlating logging data wherein the multiple physical variables may be correlated with one another through self-consistent acoustic arguments.

It has been determined that numerical simulation of Stoneley waves can be inaccurate because Fourier synthesis and finite difference methods contain discretization errors. However, where it is desired to "create" Stoneley waves to facilitate evaluation of relative properties, such waves may be simulated such as in a horizontal water wave tank, having a piston to serve as a wave maker at one end of the tank. As background to the present invention, it is known that the physical system of wave propagation characteristics in continuous media may be completely characterized once the dispersion relation is known. This dispersion relation represents the specific relation between the real frequency ($\omega^r$) and the wave length ($\lambda$) or wave number (K). The wave length ($\lambda$) and the wave number (K) are related to one another through the following relation:

$$\lambda = \frac{2\pi}{K} \qquad (13)$$

For example, the relation of equation 9 has previously been discussed ($\omega^r(K) = VK - \beta K^{1/2}$). Similarly, the hydrodynamics field has long known that surface waves (dominated by gravity, and not capillary effects) in deep water will propagate along an air-water planar interface, according to a relation satisfying:

$$\omega^r(K) = UK - g^{1/2} K^{1/2} \qquad (14)$$

Wherein:

U represents the speed of the mean current in the water; and g is the acceleration due to gravity.

Thus, there is a direct physical analogy between Stoneley waves (in equation 9) in permeable cylindrical boreholes and long water waves (equation 14) in a deep rectangular wave tank. The tank should be sufficiently long to isolate reflections from the far end, which invalidate the analogy. Accordingly, in accordance with another aspect of the present invention and with reference to FIG. 11, the piston 12 at one end of a horizontal wave tank 11 may be oscillated at a desired frequency, and the wave packet thereby created will propagate and disperse in the manner as would a Stoneley wave within a borehole. Measurements of the height of the free surface 14 will be functionally representative of pressure measurements relative to a Stoneley wave which would be obtained at a receiver. In some applications the effects of differing formations may be readily modeled by altering the mean current speed in the water (U). Changes in the gravitational acceleration g, intended to model different $\beta$'s, are accomplished by acceleration of the test tank facility in a upward or downward vertical direction.

Figure 11:
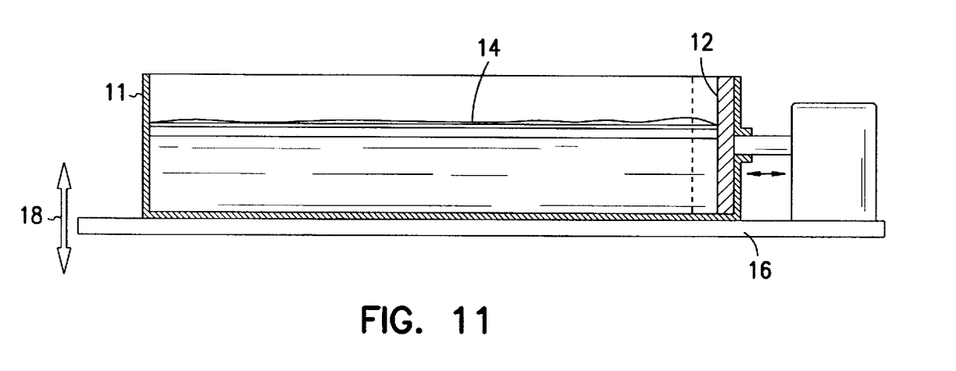
FIG. 11 depicts a water wave tank on a vertically accelerable platform in a configuration useful for analysis of Stoneley wave performance.

Accordingly, the placing of a wave tank on a vertically movable platform 16 (such as, for example, an elevator) facilitates alteration of the acceleration due to gravity, and similarly facilitates observation and measurements of the elevation of the fluid waves. This vertical elevation of the water waves will be analogous to the physical radial displacement of Stoneley waves in a cylindrical borehole, and the alteration of the acceleration due to gravity along a generally vertical axis 18 will facilitate adjustment of the lumped parameter Stoneley $\beta$.

Many modifications and variations may be made in the techniques and structures described and illustrated herein without departing from the spirit and scope of the present invention. Accordingly, it should be readily understood that the techniques and structures described and illustrated herein are illustrative only, and are not to be considered as limitations upon the scope of the present invention.

What is claimed is:

1. A method of evaluating parameters of a sub-surface formation, comprising the steps of:
   providing measurements of Stoneley wave propagation in a fluid column within a borehole penetrating said formation by imparting sonic energy into said fluid column; and
   correlating said Stoneley wave propagation data with parameters of said formation and parameters of said fluid column within said borehole, wherein selected formation parameters and said fluid parameters are functionally related to one another to define a term indicative of the velocity of said sonic energy within said fluid column as such velocity is impacted by formation characteristics.

2. The method of claim 1, wherein said Stoneley wave propagation data, said formation parameters and said fluid parameters are correlated to evaluate the permeability of said formation.

3. The method of claim 2, wherein said permeability is evaluated in response to at least one of the amplitude of said Stoneley waves and the phase velocity of said Stoneley waves.

4. A method of determining permeability of a formation in response to Stoneley wave propagation within a fluid within a borehole penetrating said formation, comprising the steps of:
   imparting energy into said fluid within said borehole, and receiving Stoneley wave data generated by said energy at two spaced receiving locations within said borehole; and
   functionally relating said Stoneley wave data to empirically-determined parameters of said formation and of said fluid in said borehole to define a lumped lithology parameter representative of said formation and fluid parameters, and utilizing said lumped lithology parameter to determine the permeability of said formation, wherein said formation parameters and said fluid parameters are functionally related to one another through the following relation:

$$\beta = (\rho_{mud} V^{5/2} / R_{well}) \sqrt{\{k\phi / (2\mu_{oil} B_{oil})\}} > 0.$$

5. The method of claim 4, wherein said permeability is determined through the relation:

$$k = \frac{2\mu_{oil}\rho_{oil}c_{oil}^2 R_{well}^2 \{(\Sigma_c - \Sigma_d)/\Sigma_c\}^2 (V/\Delta t)^2}{\rho_{mud}^2 V^5 \phi\{8\pi V f_0 - (2V/\Delta t)(\Sigma_c - \Sigma_d)/\Sigma_c\}}$$

6. A method of evaluating permeability of an earth formation, comprising the steps of:
   determining the amplitude of Stoneley waves at a plurality of spaced locations within a borehole penetrating said earth formation in response to a sonic signal introduced into said borehole; and
   defining a single velocity parameter which is functionally representative of the speed of propagation of said sonic signal within the fluid column within said borehole, as said speed of propagation is affected by the elasticity of said earth formations defining said borehole and containing said fluid column.

7. The method of claim 6, further comprising the step of functionally relating a plurality of parameters reflective of said formation and said fluid into a single dimensional parameter, which parameter is proportional to the square root of said modeled permeability.

8. The method of modeling the permeability of an earth formation penetrated by an earth borehole, comprising the steps of:
   imparting energies into a fluid column within said borehole, and determining a property of Stoneley waves generated by said imparted energies within said borehole and determine the velocity of sound with in said fluid column at least partially in response to said determined property of said Stoneley waves;
   determining a single parameter reflecting dispersion and dissipation of said Stoneley waves; and
   modeling the permeability of said earth formation in response to said determined Stoneley wave property.

9. The method of claim 8, wherein said determined Stoneley wave property is the phase velocity of said Stoneley waves.

10. The method of claim 8, wherein said determined Stoneley wave property is the amplitude of said Stoneley waves.

11. The method of claim 8, wherein said step of determining said single parameter comprises the step of functionally relating to one another parameters comprising: the density of said fluid ($\rho_{mud}$), the pore fluid modulus ($B_{oil}$), the radius of said borehole ($R_{well}$), the rock porosity ($\phi$), the pore fluid viscosity ($\mu_{oil}$), and the solid shear modulus ($G_{shear}$).

12. The method of claim 11, wherein said functionally related parameters further comprise a parameter representative of the velocity of sound within said fluid.

13. The method of claim 12, wherein said parameter representative of the velocity of sound within said fluid is reflective of the effects of borehole sidewall elasticity on said sound velocity.

14. The method of claim 11, wherein said single parameter is further determined in response to attenuation of said Stoneley waves due to permeability of said formations defining said borehole.

15. The method of claim 11, wherein said single parameter is proportional to the square root of permeability.

16. The method of claim 12, wherein said single velocity parameter is functionally representative of variations in the solids shear modulus of said formation defining said borehole.

17. A method of modeling Stoneley wave performance within a borehole, comprising the steps of:
   providing a tank containing a selected fluid having an upper surface allowing movement of said fluid at a fluid interface;
   generating waves traversing said fluid interface as a simulation of stonely wave performance; and
   determining a property of said waves traversing said interface to model Stoneley wave properties with in said fluid.

18. The method of claim 17, further comprising the step of altering the effect of gravitational forces upon said fluid interface.

19. The method of claim 18, wherein said gravitational effects are altered by acceleration of said tank along a generally vertical axis.

* * * * *